No. 868,869. PATENTED OCT. 22, 1907.
W. W. KILPATRICK.
PIPE COUPLING.
APPLICATION FILED JAN. 3, 1907.

Witnesses

Inventor
Walter W. Kilpatrick,
by
Foster, Freeman & Watson,
Attorneys

UNITED STATES PATENT OFFICE.

WALTER W. KILPATRICK, OF ATLANTA, GEORGIA, ASSIGNOR TO AIR BRAKE AND STEAM HEAT CONNECTION COMPANY, OF ATLANTA, GEORGIA, A CORPORATION OF GEORGIA.

PIPE-COUPLING.

No. 868,869.

Specification of Letters Patent.

Patented Oct. 22, 1907.

Application filed January 3, 1907. Serial No. 350,670.

*To all whom it may concern:*

Be it known that I, WALTER W. KILPATRICK, a citizen of the United States, residing at Atlanta, in the county of Fulton and State of Georgia, have invented certain new and useful Improvements in Pipe-Couplings, of which the following is a specification.

In that class of hose couplings used in connecting the pipes of steam or air brakes between different cars, the coupling elements when connected between the cars, are subjected to extended vibration, while under great internal pressure, with the result that the couplings frequently become detached. When the coupling elements or heads become detached, the weight of the hanging heads and the violent vibrations frequently result in causing the heads to become detached from the rubber connecting pipes. In other characters of couplings, such for instance as I have devised, and which constitute the subject of my application for Letters Patent Serial No. 344903, the rubber pipes are dispensed with, being substituted by metallic connections, but in such case the weight upon the coupling heads or elements is increased, with a somewhat increased tendency to cause their separation under the conditions to which they are subjected.

Figure 1:
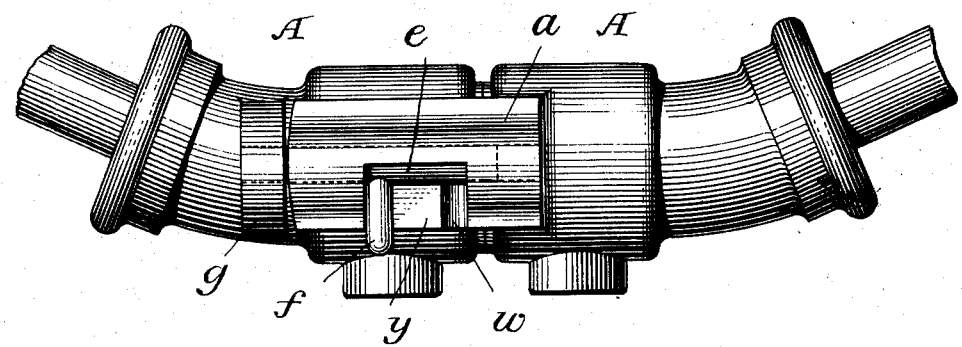
Figure 2:
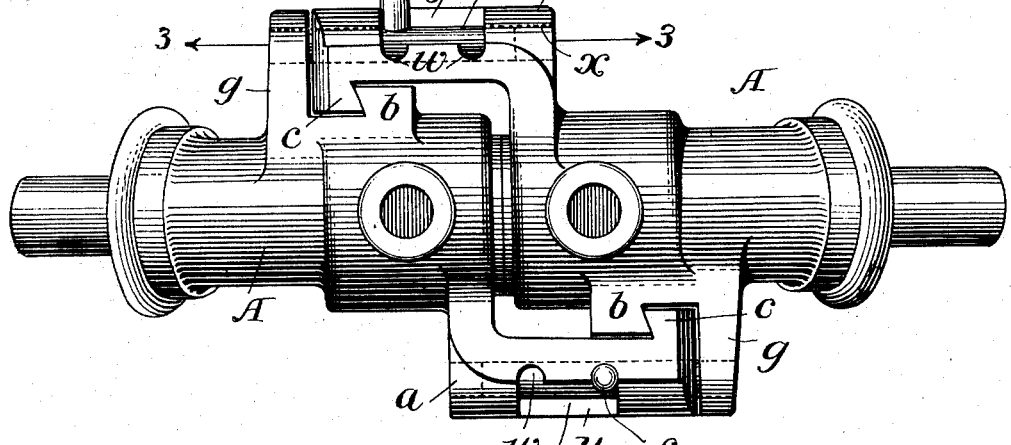
Figure 3:
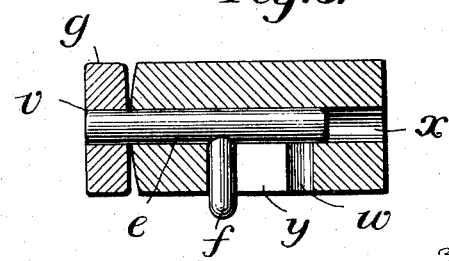

In order to avoid these objections, both in the classes of couplings where there are rubber and metallic pipe connections, I provide the coupling heads or elements with locking means which may be shifted, after the coupling heads are brought into their proper relative positions, for connection so as to hold them fixedly in their relation to each other and prevent any separation resulting from the vibrations to which they are subjected, as fully set forth hereinafter and as illustrated in the accompanying drawing, in which:

Figure 1 is a side view showing two coupling heads in connected relation and one form of locking device which may be employed; Fig. 2 is an inverted plan view of Fig. 1; and Fig. 3 is a section on the line 3—3, Fig. 2.

The coupling heads A, A are of any usual or suitable construction and each is provided with means for engaging the other, as a bracket *a* adapted to engage a bearing *d* on the opposite coupling head. As shown, the bracket *a* has a dove-tailed lip *c* which engages the undercut or dove-tailed face of the bearing *b*, but I wish it to be understood that this mode of connection is simply one means of securing the two coupling heads in their relative positions when connected, and that my invention is to be used in connection with any character of coupling means between the heads in which it can be employed.

The locking device as shown consists of a bolt *e* parallel to the axis of the head, and sliding in a support upon the head, as for instance in a longitudinal socket *x*, and which is provided with a handle *f* which extends through a lateral slot or opening *y* so that the said handle may have pressure applied to it to slide the bolt *e* longitudinally, and preferably one side of the slot *y* has notches *w* to receive the handle *f*, which can be swung so as to enter either of the said notches to thereby hold the bolt in its forward or its retracted position. Each head is provided with a lateral lug *g* having an opening or bearing *v* for receiving the end of the bolt when it is thrust outward into locking position, as shown in the drawing.

When the heads are brought into connected relation as shown, each bolt is moved outward so as to engage the opening or socket in the lug *g*, and the two heads are thus locked together. It will be seen that the means for connecting the heads to each other are the ordinary coupling or engaging devices, and that the strains tending to separate the heads come upon these engaging devices, and that the locks or bolts above described simply serve to prevent the change in the relative positions of the engaging devices when the heads are locked together, so as to maintain the strain upon these devices, while there is comparatively little strain upon the bolts themselves. For this reason there is no tendency of the bolts to be displaced by the strains upon the coupled elements. Further it will be seen that when the heads are locked together and thus held in axial alinement, the handles *f* are vertical and tend therefore to retain this position and to remain in the notches *w*, there being no tendency whatever resulting from the movements of the coupled heads to displace the handles from the notches, and consequently no danger of displacing the bolts longitudinally, even if any of the movements of the head had this tendency, which they have not.

The longitudinal position of the bolts has proved to be a factor of importance inasmuch as there is no tendency to shear the bolts transversely as results when the bolts are arranged transversely, whenever there is a tendency to separate the heads. It will be seen that any longitudinal separation of the heads, such for instance as might occur if the lugs *b*, *b* should break, would have no tendency whatever to break the bolts *e*.

It will further be seen that the locking devices do not depend for their movement or retention in position upon the use of springs, which are always likely to become inoperative.

Without limiting myself to the precise construction and arrangement of parts illustrated in the drawing, I claim as my invention:

1. The combination in a pipe coupling of two duplicate heads, each having a bracket with an undercut lip arranged to overlap the other head and an undercut shoulder adapted to be engaged by the lip of the other bracket, a bolt sliding in each bracket parallel to the axis of the head, and a socket carried by each head adapted to receive the bolt carried by the other bracket.

2. The combination in a pipe coupling, of two duplicate heads, means for interlocking said heads against separation lengthwise, the said means including a bracket on each head extending beyond the pipe section, a locking bolt in each bracket parallel to the axis of the head, and a lug upon each head provided with a socket to receive the end of the locking bolt.

3. The combination in a pipe coupling, of two duplicate heads each having upon one side a bracket extending beyond the pipe section and upon the other side a bearing shoulder, the bracket of each adapted to engage the bearing shoulder of the other and thereby lock the parts against endwise separation, a bolt mounted in each bracket parallel to the axis of the head, a lug upon each head beyond the bearing shoulder adjacent the end of the bracket carried by the other head and having a socket adapted to receive the end of said bolt.

4. The combination in a pipe coupling for the flexible pipes of railway trains, of two duplicate heads each having upon one side a bracket and upon the other side a bearing shoulder, the bracket of each engaging the bearing shoulder of the other, a bolt mounted in each bracket parallel to the axis of the head, a lug upon each head adjacent the bracket of the other when the parts are interlocked, the said lug being provided with a socket for receiving the end of the bolt whereby the parts are locked together.

5. A coupling head for pipes, comprising a main head section having upon one side a bracket extending beyond the main head section and provided with a locking shoulder, a locking bolt mounted in said bracket parallel to the axis of the head and adapted to project beyond the end thereof, a bearing shoulder on the opposite side of the head, and a lug on said head on the same side as the bearing shoulder and a distance from the end of the head approximately equal to the distance that the bracket extends beyond the head, the said lug being provided with a socket adapted to receive the end of a locking bolt.

In testimony whereof I affix my signature in presence of two witnesses.

WALTER W. KILPATRICK

Witnesses:
JAMES E. GARST,
W. W. TRACY.